United States Patent [19]
Keigley

[11] Patent Number: 5,806,605
[45] Date of Patent: Sep. 15, 1998

[54] IMPLEMENT FOR PREPARING SEEDBEDS

[75] Inventor: Kevin V. Keigley, Osceola, Ind.

[73] Assignee: Hydroseed Manufacturing, Incorporated, Granger, Ind.

[21] Appl. No.: 740,374

[22] Filed: Oct. 29, 1996

[51] Int. Cl.$^6$ .................................................. E02F 3/76
[52] U.S. Cl. .................. 172/145; 172/197; 172/198; 172/200; 172/445.1; 172/449; 172/683; 172/684.5
[58] Field of Search ................................ 172/445.1, 449, 172/450, 683, 684.5, 200, 199, 196, 198, 197, 145

[56] References Cited

U.S. PATENT DOCUMENTS

| | | | |
|---|---|---|---|
| 3,122,209 | 2/1964 | Crites | 172/445.1 X |
| 3,336,685 | 8/1967 | Keller | 172/445.1 |
| 4,320,988 | 3/1982 | Seal | 172/445.1 X |
| 4,333,250 | 6/1982 | Henderson | 172/445.1 X |
| 4,869,326 | 9/1989 | Hutchins et al. | 172/445.1 X |
| 4,886,124 | 12/1989 | Kleinhuizen | 172/445.1 X |
| 4,924,945 | 5/1990 | Mork | 172/445.1 X |
| 5,397,200 | 3/1995 | Seal | 172/445.1 X |

FOREIGN PATENT DOCUMENTS

| | | | |
|---|---|---|---|
| 1314296 | 11/1962 | France | 172/445.1 |
| 2587580 | 3/1987 | France | 172/445.1 |
| 2129034 | 5/1984 | United Kingdom | 172/445.1 |

*Primary Examiner*—Michael J. Carone
*Assistant Examiner*—Christopher J. Novosad
*Attorney, Agent, or Firm*—Baker & Daniels

[57] ABSTRACT

An implement for preparing seedbeds and lawns includes a main frame member upon which are mounted scarifying teeth to penetrate the soil and tines which work the soil and prepare the final grade after the soil has been scarified. A subframe is pivotally mounted on the main frame and carries a grading blade ahead of the scarifying teeth when the implement is move in the forward direction. The blade is allowed to float relative to the main frame on the subframe to thereby knock down vegetation, remove rocks and lightly grade the soil. The subframe can be moved relative the main frame to a position lifting the scarifying teeth and the tines off of the ground and allowing the blade to provide a deeper grading of the soil or the subframe may be moved to a position lifting the blade off of the soil so that the soil is contacted only by the scarifying teeth and the tines. The implement can also be used to transfer soil to fill in low places, as the main frame member upon which the tines and scarifying teeth are mounted have a pair of intersecting lips which with the tines define a scoop that is capable of picking up limited amounts of soil and transferring the soil to low places when the implement is moved in the backward direction.

15 Claims, 7 Drawing Sheets

IMPLEMENT FOR PREPARING SEEDBEDS

This invention relates to an implement towed by a towing vehicle for preparing lawns and seedbeds. Reference is made to my prior U.S. Pat. Nos. 5,413,181 and 5,515,625.

Preparation of lawns and seedbeds, particular around new construction, requires a great deal of soil preparation, which heretofore has been accomplished manually, often at substantial expense. Vegetation, small rocks, twigs, etc. must be removed from the seed bed, the soil must be scarified, and the seed bed or lawn must be graded and worked into the final grade prior to planting or seeding. Furthermore, it is often necessary to move soil from one area to another, to fill in low places. These low places are common around sidewalks, driveways, and other concrete work, and care must be taken to assure that any power equipment is not driven on or across the sidewalks, particularly if the concrete is not yet fully cured.

The present invention provides an implement for grading, working and scarifying the soil. The implement is towed behind a small tractor or other vehicle and is connected to the tractor by a common three point hitch, so that the implement may be raised and lowered and the angle of the implement may be adjusted relative to the ground. The implement includes a main frame upon which scarifying teeth extend at a soil penetrating angle and are distributed across the width of the implement. A main frame also supports tined members which extend parallel to the direction of travel to work and provide a final grade to the soil. The scarifying teeth are rigidly attached to the frame and thus scarify soil when the tractor is moved in either the forward or backward directions. When the implement is moved backward, the member on which the scarifying teeth and tines are mounted scoop up soil which can be transferred and accurately placed in low places, particularly around walks and driveways. Finally, a blade is mounted on a subframe which is pivotally mounted on the main frame. The blade follows the contour of the ground and when the tractor is driven over the ground, removes vegetation, small rocks, etc. before the ground is scarified. The subframe on which the blade is mounted can be locked in a raised position when the blade is not used or the blade can be locked in a lowered position in which the scarifying teeth and tines are raised off of the ground so that the implement may also be used for rough grading.

These and other advantages of the invention become apparent from the following description, with reference to the accompanying drawings, in which.

Referring now to the drawings, an implement generally indicated by the numeral 10 includes a main frame generally indicated by the numeral 12 which includes a pair of substantially parallel main frame members 14 and 16 which extend transversely across the path along which the implement 10 is pulled by a tractor indicated in phantom at 18. A pair of side frame members 20, 22 interconnect the main frame members 14 and 16. The main frame member 14 is provided with a conventional three point hitch assembly generally indicated by numeral 24, consisting of hitch points 26, 28 and 30, which are adapted to be connected to corresponding hitch points on tractor 18 in a manner well known to those skilled in the art. A reinforcing member 25 connects the hitch assembly to main frame member 16. Tractor 18 is provided with hydraulic cylinders that raise and lower the implement 10 and are also able to adjust the angle of the implement 10 relative to ground.

The main frame member 16 includes a pair of lips 32, 34 which are connected together such that the lip 34 extends from the lip 32 at substantially right angles. A tined member generally indicated by the numeral 36 is mounted to the lip 32 and includes tines 38 which project from the lip 32 in a direction substantially parallel to the direction of travel of the implement 10. The tines 38 are relatively closely spaced, and when engaged with the soil, work and level the soil to provide a final grade as will hereinafter be explained. The tines 38, and the lips 32 and 34, cooperate to define a scoop for capturing soil to permit soil to be transferred as will also be hereinafter explained.

Transversely spaced sockets generally indicated by the numeral 40 are secured, for example, by welding, to the side of the lip 34 opposite the side from which the lip 32 extends. Each of the sockets 40 slidably receive a scarifying tooth 42. Each of the scarifying teeth 42 are made of a strong, solid material such as steel and has a cross-section comparable to the cross-section of the sockets 40 so that the scarifying teeth 42 are slidably received within the sockets 40. Each of the sockets 40 and teeth 42 as provided with cooperating, transversely extending apertures 44. A clinch pin 46 is installed in one of the apertures 44 and extends through the corresponding scarifying tooth 42 to hold the tooth 42 in the socket 40. Because a series of aligned openings 44 are provided, the distance that the scarifying teeth extends from the corresponding socket, and, therefore, the distance that the scarifying teeth penetrate into the ground, is adjustable. Since the scarifying teeth 42 wear, the scarifying teeth 42 also may be extended from their corresponding sockets 40 to compensate for wear while maintaining penetration of the tooth into the ground at a predetermined distance. Since the sockets 40 are welded to the lip 34, the teeth 42 are rigidly attached to the main frame member 16 so that the scarifying teeth 42 may be used to scarify soil during movement of the implement 10 either forward or backward. For proper scarifying, the teeth must not be too close together, or the teeth will merely pull soil instead of scarifying the soil, and must not be spaced too far apart, or scarifying will be inadequate. It has been found that placing the sockets 40 about every eight inches (on center) is about the optimum spacing.

Brackets 48 secured along the length of the main frame member 14 and are provided with an aperture 50 for receiving a pivot pin 52 for pivotally connecting subframe members 54 to the main frame member 14. The subframe members 54 are components of a subframe generally indicated by the numeral 56 and are secured to transverse subframe member 58 through bracket 60 which provides a rigid connection between the subframe members 54 and the transverse subframe member 58. A grading blade 60 is secured to the transverse subframe member 58 and is adapted to engage the soil as will hereinafter be explained. The subframe members 54 adjacent the side frame members 20 and 22 are provided with extensions 62 which are slidably received in a gap 64 defined between a first set of spaced apart channel members 66, which extend upwardly from main frame member 16 and are secured to the lip 34 adjacent the side frame member 22, and a second set of channel members 68, which are similarly secured to the lip 34 of main frame member 16 adjacent the side frame member 20. The channel member 66, 68 are each provided with registering apertures 70, which receive a removable clinch pin 72 as will hereinafter be described. The width of the gap 64 is sufficient to permit the extensions 62 to move up and down within the gap 64 while the channel members restrains transverse movement of the subframe members 54.

Figure 1:
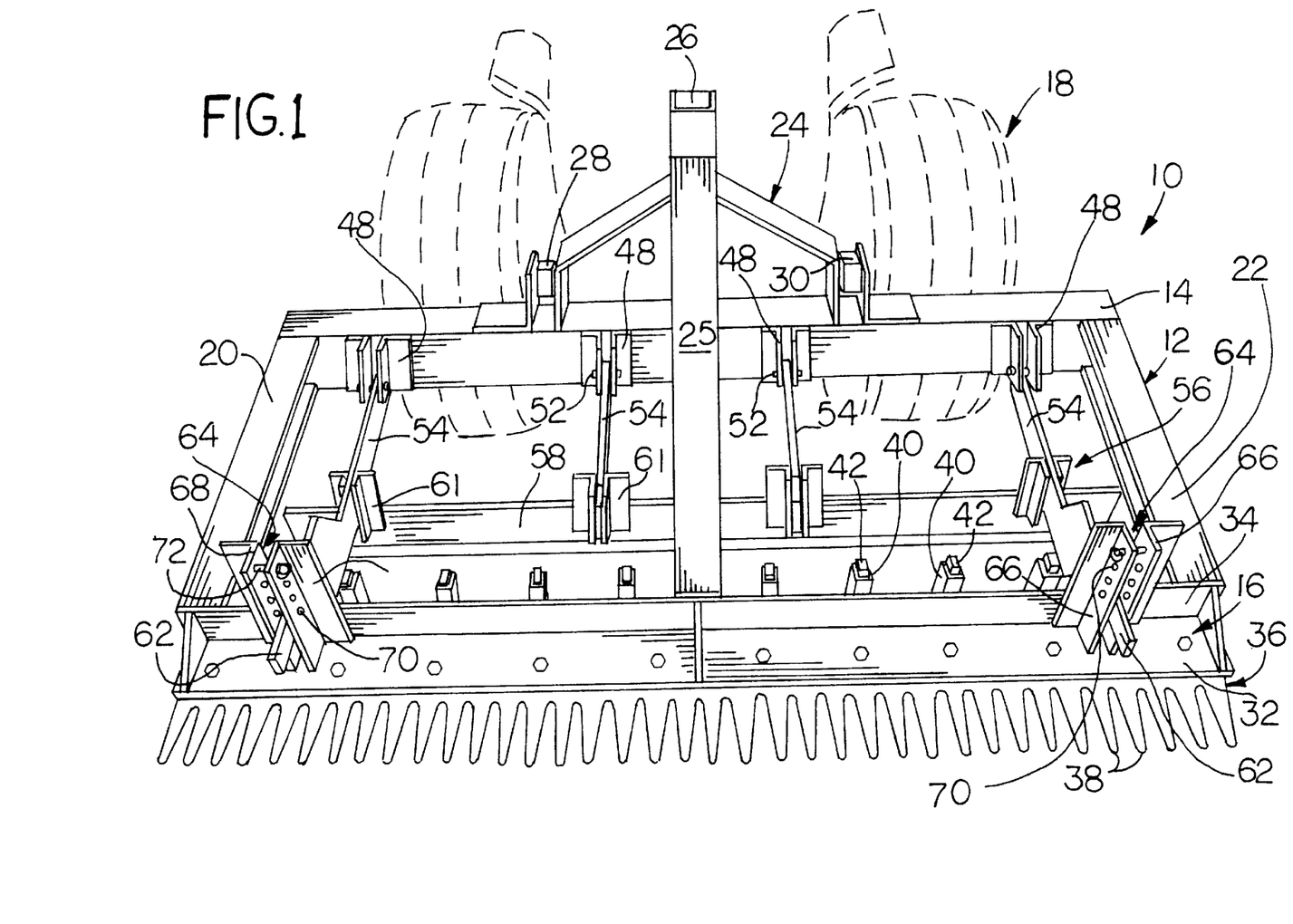
FIG. 1 is a view in perspective of an implement made according to the teachings of the present invention, the portion of the tractor used for pulling the implement being showing in phantom.
Figure 2:
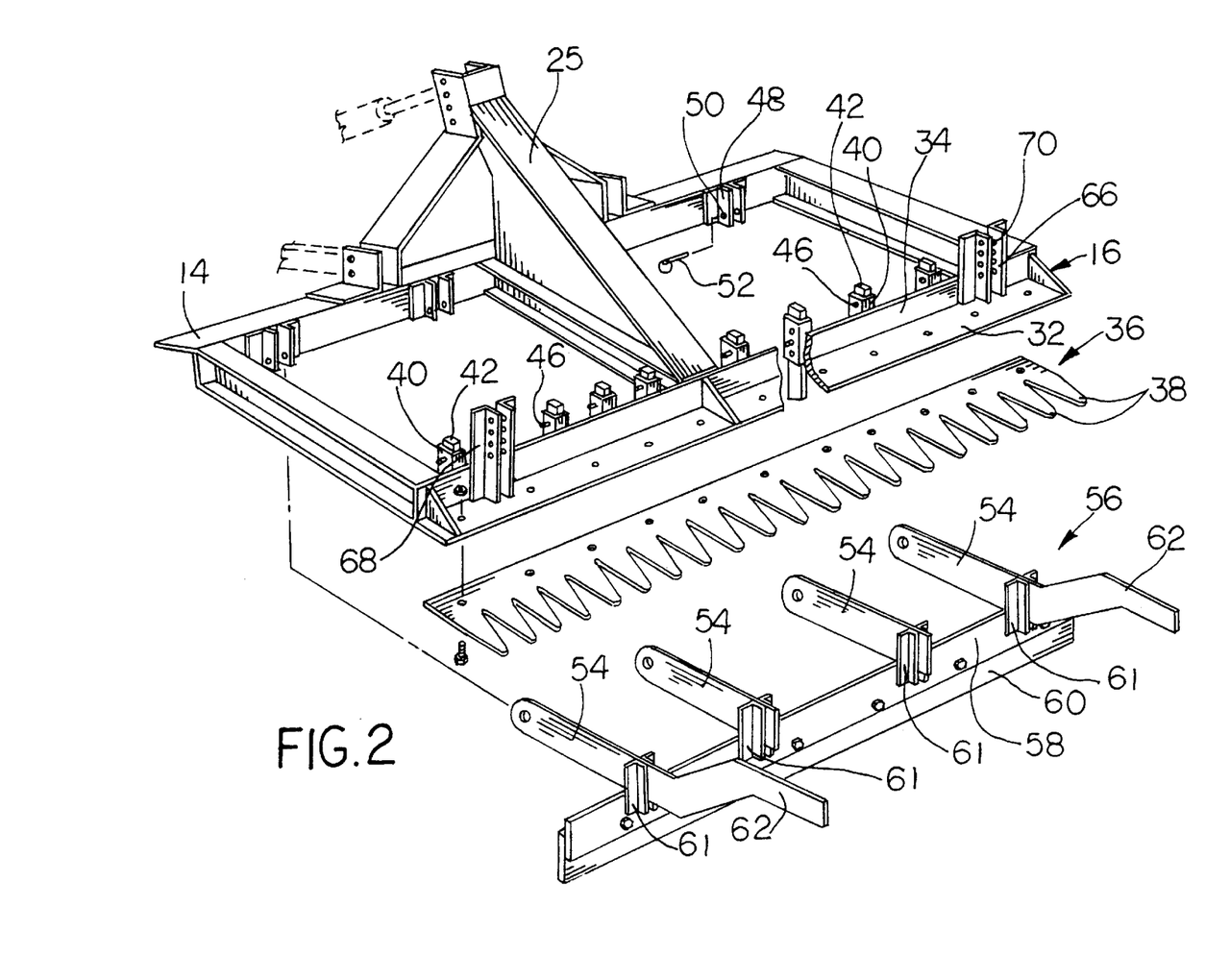
FIG. 2 is an exploded perspective view illustrating the components of the implement of the present invention.
Figure 3:
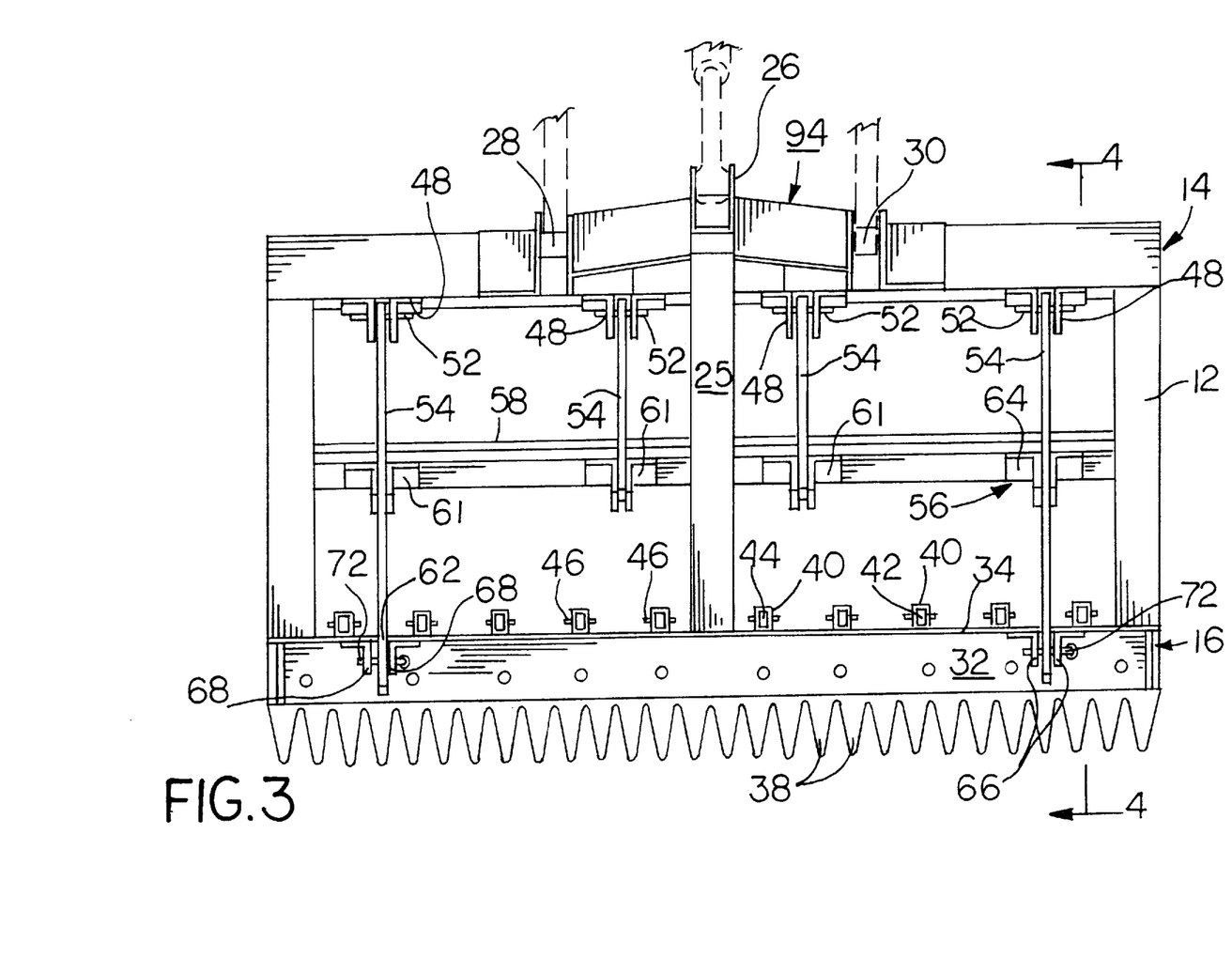
FIG. 3 is a top plan view of the implement according to the present invention.
Figure 4:
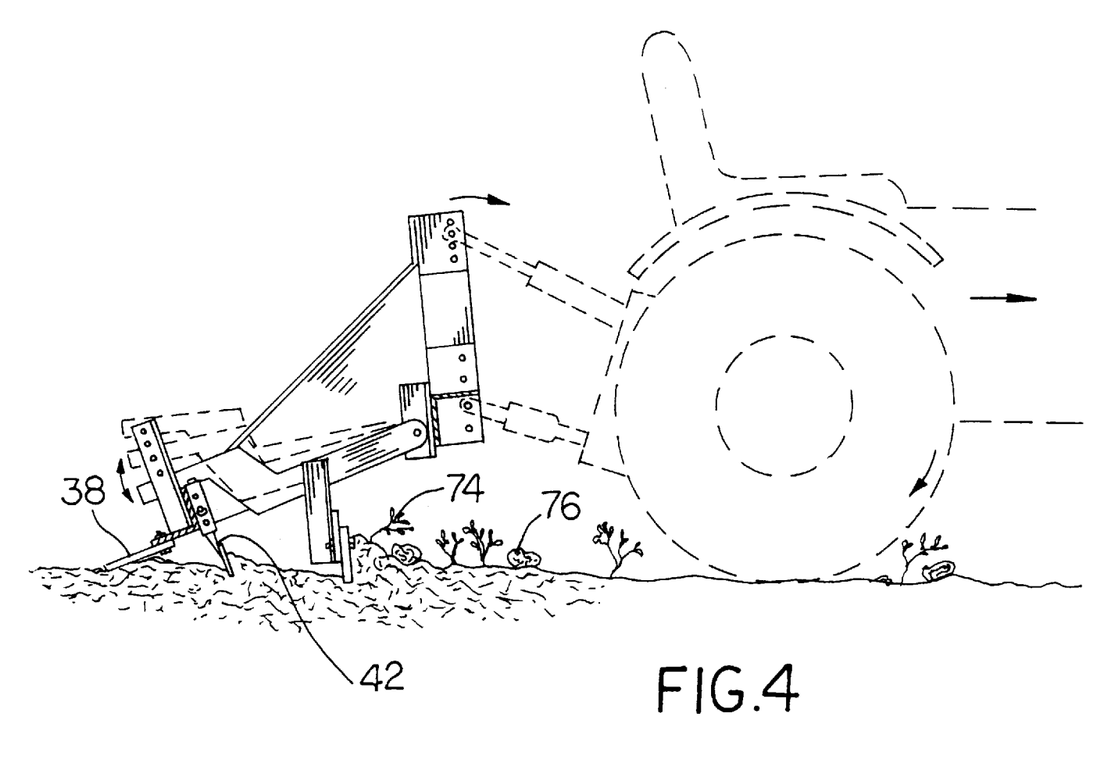
FIG. 4 is cross-sectional view taken substantially along lines 4—4 of FIG. 3, the tractor used to pull the implement being illustrated in phantom.

In operation, and referring to FIG. 4, the implement 10 is illustrated as being used in the normal manner. Because of the pivotal connection between the subframe 56 and the main frame 12, the blade 60 is permitted to "float" as the implement is pulled along a path over the ground. In this condition, the blade 60 knocks down vegetation as at 74 and collections small rocks and stones 76, and grades lightly but does not penetrate the ground to any appreciable extent. The scarifying teeth 42 are set to penetrate the ground to scarify and break up the soil, and are followed by the tines 38, which work the soil and provide a final grade, the angle of the implement 10 being set by the operator such that the scarifying teeth 42 penetrate the ground and the tines 38 engage the surface of the ground while the tines are effective in working and grading the soil. The pin 72 is placed in the uppermost of the apertures 70 to thereby limit upward movement of the subframe 56. If it is desired the movement flotation of the blade 60 to a greater extent, the pin 72 may be placed in the aperture just below the uppermost aperture.

Figure 5:
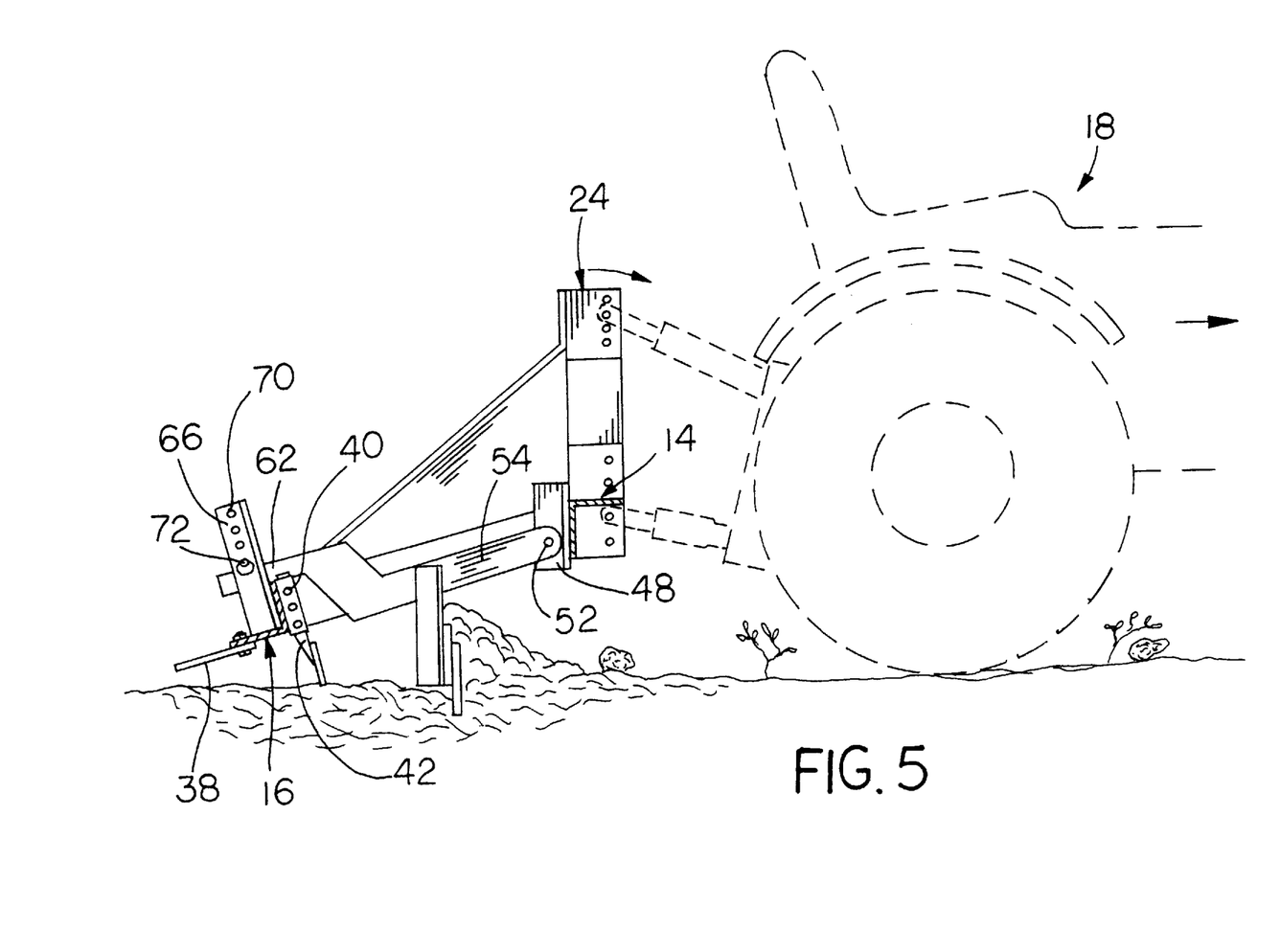
FIG. 5 is a view similar to FIG. 4, illustrating the implement with the scarifying teeth and grading tines raised in an upper position so that the blade is used to provide a rough grade of the soil.

There are situations in which it is necessary to use the blade 60 to provide a deeper penetration to level off high spots in the soil. Accordingly, the main frame 12 is raised relative to the subframe 56 such that the upper edges of the extension 62 are below the lower most of the apertures 70. As illustrated in FIG. 5, the pin 72 is placed through the normal apertures, and locks the blade 60 in the lowered position with both the scarifying teeth 42 and tines 38 raised above the surface of the soil. Accordingly, grading can be effected on an initial pass over the seedbed, which may be followed by passes in which the seedbed is scarified, worked and leveled, as indicated in FIG. 6.

Figure 6:
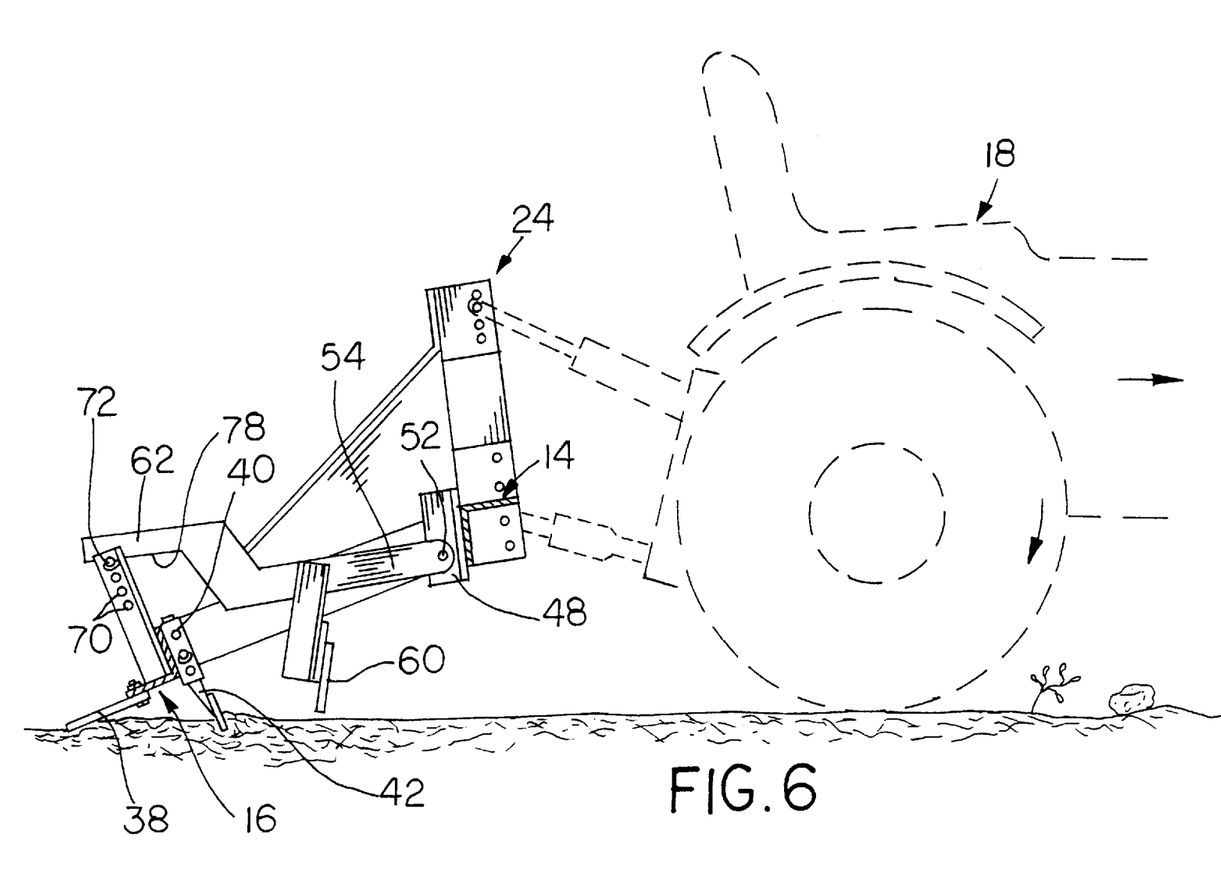
FIG. 6 is view similar to FIGS. 4 and 5, but illustrating the blade of the implement in the raised position in which the blade is not used.

In FIG. 6, an initial grade has been provided and the vegetation and rocks have been removed beforehand. The subframe 56 is raised relative to the main frame 12 and the pins 72 are placed in the uppermost apertures 70 such that the lower surfaces of 78 are engaged with the pins, thus locking the blade 60 in a position where it does not engage the soil, the main frame 12 having been set at an angle that permits the scarifying teeth to penetrate the soil and the tines 38 to engage the soil for working and providing a final grade.

Figure 7:
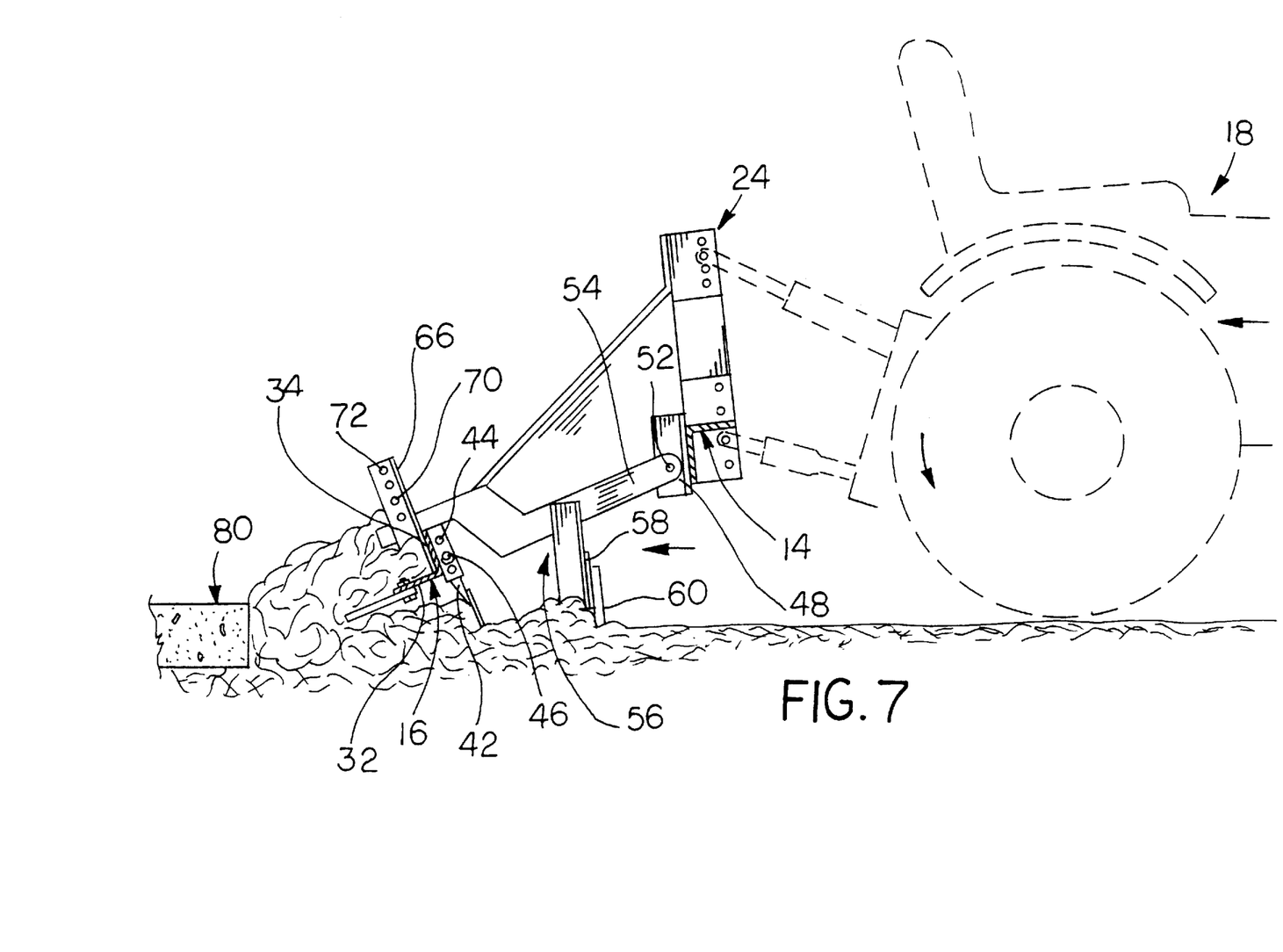
FIG. 7 is a view similar to FIGS. 4–6, but illustrating the manner in which soil can be transferred when the implement is moved in the reverse direction to fill in low places in the lawn or seed bed.

There are times during landscape work when soil must be moved to fill in low spots, particularly along concrete work such as along driveways and sidewalks. Particularly with new construction, care must be taken that no substantial weight be placed on the concrete which has not yet fully cured. Accordingly, it is not permissible to drive heavy equipment, such as tractors, on or over the concrete work. Referring to FIG. 7, the lips 32, 34 of the main frame member 16, along with the tines 38 define a scoop in which soil is caught and can be transferred to fill in low places, particularly low places adjacent concrete work generally indicated by the numeral 80. After the soil has been deposited in the low place, the soil may be worked into a final grade by using the tines 38 as above described. Accordingly, soil may be positioned accurately to fill in low places, all without driving the tractor over adjacent concrete driveways and sidewalks.

I claim:

1. Implement for working soil comprising a main frame, a hitch mounted on said main frame for attaching the main frame to a vehicle for towing the main frame along a path, said main frame extending substantially transverse to said path, multiple tines extending from the main frame, said tines being spaced from one another along said main frame, said main frame being adjustable relative to the vehicle to move the tines into engagement with soil at an angle to work and grade soil, said main frame also being adjustable relative to the vehicle to move the tines out of engagement with said soil, a subframe mounted on said main frame by a pivot connection for pivoting along a substantially horizontal axis, a blade mounted on said subframe against movement relative to the subframe, said blade extending substantially parallel to said main frame whereby said blade is permitted to move relative to said tines, said subframe being moveable about said axis from an upper position to a lowered position, and a manually releasable latching means for releasably latching said subframe in said upper position.

2. Implement as claimed in claim 1, wherein said main frame includes guides engaging said subframe for restraining said subframe against substantial movement transverse to said main frame.

3. Implement for working soil comprising a main frame including a pair of substantially parallel main frame members, a hitch mounted on one of said main frame members for attaching the frame to a vehicle for towing the frame along a path, said main frame members extending substantially transverse to said path, multiple tines extending from the other main frame member, said tines being spaced from one another along said other main frame member, said main frame being adjustable relative to the vehicle to move the tines into engagement with soil at an angle to work and grade soil, said main frame also being adjustable relative to the vehicle to move the tines out of engagement with said soil, multiple rigid scarifying teeth rigidly mounted on said other main frame member, and a blade carried by said main frame between said main frame members, said blade being movable into a position engaging soil.

4. Implement as claimed in claim 3, wherein said blade is mounted on said frame through a connection permitting relative movement between the blade and the main frame to permit the blade to follow the contours of the soil as the main frame is moved along said path.

5. Implement as claimed in claim 4, wherein said connection is a pivoting connection.

6. Implement as claimed in claim 5, wherein latching means carried by said main frame is movable into a restraining position limiting pivoting of said blade relative to said main frame.

7. Implement as claimed in claim 5, wherein latching means carried by the main frame is movable to a suspending position locking the blade to a support carried by the mainframe in a position suspending the blade above the soil when the tines engage the soil.

8. Implement as claimed in claim 5, wherein latching means carried by the main frame is movable to a position locking the blade to a support carried by the mainframe in a position in which the blade is maintained in engagement with the soil and the tines are suspended from the soil.

9. Implement as claimed in claim 5, wherein said other main frame member is defined by a pair of lips extending transversely to said path, said tines being mounted on one of said lips, the other lip extending from said one lip and cooperating with the one lip and said tines to form a scoop for catching soil, whereby said tines grade and work soil when the vehicle moves the implement in one direction and the scoop catches soil when the vehicle is moved in the opposite direction.

10. Implement for working soil comprising a main frame, a hitch mounted on said main frame for attaching the main frame to a vehicle for towing the main frame along a path, said main frame extending substantially transverse to said path, multiple tines extending from the main frame, said tines being spaced from one another along said main frame, said main frame being adjustable relative to the vehicle to move the tines into engagement with soil at an angle to work and grade soil, said main frame also being adjustable relative to the vehicle to move the tines out of engagement with said soil, a subframe mounted on said main frame by a pivot connection for pivoting along an axis, and a blade mounted on said subframe and extending substantially parallel to said main frame whereby said blade is permitted to move relative to said tines, said main frame including guides engaging said subframe for restraining said subframe against substantial movement transverse to said main frame, said guides including restraining members defining a channel therebetween, said subframe including a pair of subframe members spaced transversely relative to said path, each of said subframe members being attached to said main frame at said pivot connection and including an extension slidably received in a channel defined by a corresponding one of said guides.

11. Implement as claimed in claim 10, wherein latching means carried by said guides is movable into a restraining position extending across said channel to thereby limit pivoting movement of the subframe relative to the main frame.

12. Implement as claimed in claim 11, wherein said latching means is movable to a ground engaging position engaging said extensions to lock the latter to the guides to prevent relative movement of the subframe relative to the main frame in a position in which the blade is maintained in engagement with the soil and the tines are suspended from the soil.

13. Implement as claimed in claim 10, wherein latching means carried by said guides is movable to a suspending position engaging said extensions to lock the latter to the guides to prevent relative movement of the subframe relative to the main frame in a position suspending said blade above the soil when the tines engage the soil.

14. Implement as claimed in claim 10, wherein rigid scarifying teeth are rigidly secured to said main frame and extend from said main frame at a ground-penetrating angle when the tines are engaged with said soil at the angle to work and grade said soil, said scarifying teeth being mounted between said tines and said blade.

15. Implement as claimed in claim 10, wherein said main frame includes a member defined by a pair of lips extending transversely to said path, said tines being mounted on one of said lips, the other lip extending from said one lip and cooperating with the one lip and said tines to form a scoop for catching soil, whereby said tines grade and work soil when the vehicle moves the implement in one direction and the scoop catches soil when the vehicle is moved in the opposite direction.

* * * * *